(12) United States Patent
Nakata et al.

(10) Patent No.: US 6,548,803 B1
(45) Date of Patent: Apr. 15, 2003

(54) LASER BEAM RECEIVING UNIT

(75) Inventors: Naotaro Nakata, Kyoto (JP); Hironori Endo, Nagano (JP)

(73) Assignees: Rohm Co., Ltd., Kyoto (JP); Seiko Epson Corporation, Tokyo (JP)

( * ) Notice: Subject to any disclaimer, the term of this patent is extended or adjusted under 35 U.S.C. 154(b) by 48 days.

(21) Appl. No.: 09/684,955

(22) Filed: Oct. 5, 2000

(30) Foreign Application Priority Data

Oct. 6, 1999 (JP) .......................................... 11-286088

(51) Int. Cl.[7] ................................................ H01J 3/14
(52) U.S. Cl. ...................................... 250/216; 250/573
(58) Field of Search ................................ 250/216, 573; 356/614, 624; 73/800, 862, 861, 77, 324, 624

(56) References Cited

U.S. PATENT DOCUMENTS

| 5,343,291 A | * | 8/1994 | Ohwada et al. ............. 356/509 |
| 5,373,151 A | * | 12/1994 | Eckel, Jr. et al. ......... 250/208.1 |
| 5,511,035 A | * | 4/1996 | Russell ....................... 356/234 |
| 5,700,084 A | * | 12/1997 | Yasukawa et al. .......... 362/275 |
| 6,294,778 B1 | * | 9/2001 | Cappiello ................... 250/234 |

* cited by examiner

*Primary Examiner*—Seungsook Ham
*Assistant Examiner*—Eric Spears
(74) *Attorney, Agent, or Firm*—Arent Fox Kintner Plotkin & Kahn, PLLC

(57) ABSTRACT

A light receiving unit comprises a condenser lens (11) which converges laser beam and a light receiving unit (12) which receives the incident beam converged by the condenser lens. The light receiving element is formed, such that the light receiving portion thereof has an area of 2 mm$^2$ or less and disposed at the side of the condenser lens than the point P where the beam is converged by the condenser lens and at the position more apart from the condenser lens than the position F of the focal distance of the condenser lens. As a consequence, a light receiving unit which detects the laser beam can be obtained, the light receiving unit enabling it possible to always receive the laser beam regardless of a little eccentricity of a laser source while the speed of response is raised.

6 Claims, 3 Drawing Sheets

LASER BEAM RECEIVING UNIT

FIELD OF THE INVENTION

The present invention relates to a laser beam receiving unit used in the case of detecting whether flying fine particles pass or not by allowing the flying fine particles, liquid droplets and the like to intercept the fine beam of a laser light to detect a reduction in the strength of the laser beam, for instance, like a laser sensor used to detect ink droplets of an ink jet printer, and, particularly, to a laser beam receiving unit which can detect fine particles exactly at a high response rate even if the speed of the fine particles intercepting the laser beam is high.

BACKGROUND OF THE INVENTION

Conventional laser beam receiving units include those which, as shown in FIG. 3, converge a laser light 31 which propagates through a space by a condenser lens 32 and receives the laser light 31 by a light receiving element 33, e.g. a photodiode or those which, as shown in FIG. 4, converge a laser light 31, emitted from the end face of an optical fiber 35, by a condenser lens 32 and receives the laser light 31 by a light receiving element 33, e.g. a photodiode.

Laser light which propagates as parallel light as shown in FIG. 3 is received by a photodiode 33 disposed at the position of the focal distance f of the condenser lens 32. Also, as shown in FIG. 4, when incident light is not parallel light, a photodiode 33 is disposed at the position s" determined by the Gauss' theorem (the formula of a convex lens) given by the following formula:

$$1/s + 1/s'' = 1/f$$

provided that the distance between the end face of an optical fiber 35 and the opposed surface of the condenser lens 32 is s and the distance between the backface of the condenser lens 32 and the light receiving element 33 is s".

In the case where the laser beam is once converged in a space, fine particles and the like are detected at a narrow part of the beam diameter and thereafter the beam which rediverges is received, the receiving element is also disposed at the position s" determined by the aforementioned Gauss' theorem.

The condenser lens 32 is formed of an aspheric lens and formed so that the laser beam converges at the aforementioned determined position s" even though the beam is incident on an end side of the condenser lens eccentrically and convergent point is off the center line, the optical axis of which is inclined relative to the condenser lens. Because of this reason, a relatively large light receiving element is formed, which makes it possible to receive light with the best sensibility without any trouble even if there exists a little eccentricity on the side of the laser source.

As outlined above, the conventional light receiving unit such as those for laser sensors is designed to be disposed on the convergent point of the condenser lens to raise the sensibility of the light receiving element sufficiently. While, as will be mentioned later, the inventors of the present invention have found that as for a light receiving portion which detects high speed fine particles, if the area of a light receiving element is increased, the capacity of the light receiving portion is increased and the responsivity of the light receiving portion is reduced. It is therefore necessary to decrease the area of the light receiving element. However, if the area of the light receiving element is decreased, there is the problem that when the beam incident on the light receiving unit is eccentric, the laser beam is not incident on the light receiving element and hence there is the case where the laser beam cannot be detected at all.

SUMMARY OF THE INVENTION

The present invention has been conducted to solve such a problem and it is an object of the present invention to provide a light receiving unit used to detect a laser beam, the light receiving unit being able to always receive light regardless of a little eccentricity of a laser source while the response speed is raised.

The inventor of the present invention has earnestly investigated the reason why the variation of fine particles can not be detected sufficiently when flying fine particles such as droplets of an ink jet printer are detected by a conventional laser sensor and, as a result, found that the reason is that a light receiving element can respond only insufficiently to the variation of the fine particles. Then the inventor has conducted further investigations and, as a result, found that if the area of the light receiving element is large, the capacity of the light receiving element is increased, the response speed becomes low and high speed fine particles cannot be detected sufficiently if the area is designed to be 2 mm$^2$ or less. The inventor has also found that although the case where an eccentrically incident beam can be received insufficiently arises when the area of the light receiving element is small, even the eccentric beam can be received sufficiently by locating the light receiving element at a position before the convergent point (image point).

A laser beam receiving unit according to the present invention, which receives the laser beam to detect a detection object passing through the laser beam comprising: a condenser lens which converges the laser beam and a light receiving element which receives the incident beam converged by the condenser lens, wherein the light receiving element is formed, such that the light receiving part thereof has an area of 2 mm$^2$ or less, and disposed at the side of the condenser lens than the point where the beam is converged by the condenser lens and at the position more apart from the condenser lens than the position of the focal distance of the condenser lens.

Here, the point where the beam is converged, that is convergent point means the point at which the beam spread from a light source is converged by the condenser lens and form an image.

This structure ensures that because the condenser lens made of an aspheric lens is formed so that also beam which is eccentrically incident crosses the center line of an optical system and converges on a plane positioned at the same distance from the lens as that of the convergent point of the beam emitted from a non-eccentric light source, a portion where the eccentric beam crosses the non-eccentric beam is formed closer to the condenser lens to the convergent point. As a consequence, by shifting the light receiving element to the side of the condenser lens as far as the portion where the beam from a light source having the largest allowable eccentricity crosses the center line of the condenser lens and the light receiving element, beam from any eccentric light source is incident on the light receiving surface of the light receiving element.

When the focal distance of the condenser lens is f, the distance between the point where the laser beam is converged by the condenser lens and the condenser lens is s" and the distance between the position where the light receiving element is disposed and the condenser lens is x, preferably the light receiving element is disposed at the position determined by the formula $f \leq x \leq (s''+f)/2$.

The size of the light receiving element is preferably a 1 mm by 1 mm square or less, and more preferably a 0.75 mm by 0.75 mm square or less to raise the response speed.

The laser beam is, for instance, a beam in which the laser light emitted from a laser source is converged by the condenser lens to form a minimum beam spot portion, and a part of which is intercepted by a detection object passing through the minimum beam spot portion is detected by the light receiving unit.

When the detection object is high speed fine particles, specifically, ink droplets of an ink jet printer, the consumption of ink can be detected exactly and hence the invention has a high effect.

BRIEF DESCRIPTION OF THE DRAWINGS

In the accompanying drawings, there are shown illustrative embodiments of the invention from which these other of its objectives, novel features, and advantages will be readily apparent.

In the drawings.

DETAILED DESCRIPTION

Next, a laser beam receiving unit according to the present invention will be explained with reference to the drawings. The laser beam receiving unit of the present invention receives the laser beam to detect a detection object passing through the laser beam. As shown FIG. 1 (a) and FIG. 1 (b), the laser beam receiving unit comprises a condenser lens 11 which converges the laser beam and a light receiving element 12 which receives the incident beam converged by the condenser lens 11. The light receiving unit 12 is formed so that the area of the light receiving portion thereof is 2 mm² or less and as shown by an enlarged explanatory view of a light receiving unit 10 in FIG. 1(b), the light receiving element 12 is disposed on the side of, and closer to, the condenser lens 11 than the point P where the beam is converged by the condenser lens 11 and at the position more distant from the condenser lens 11 than the position F of the focal distance of the condenser lens 11.

Figure 1:
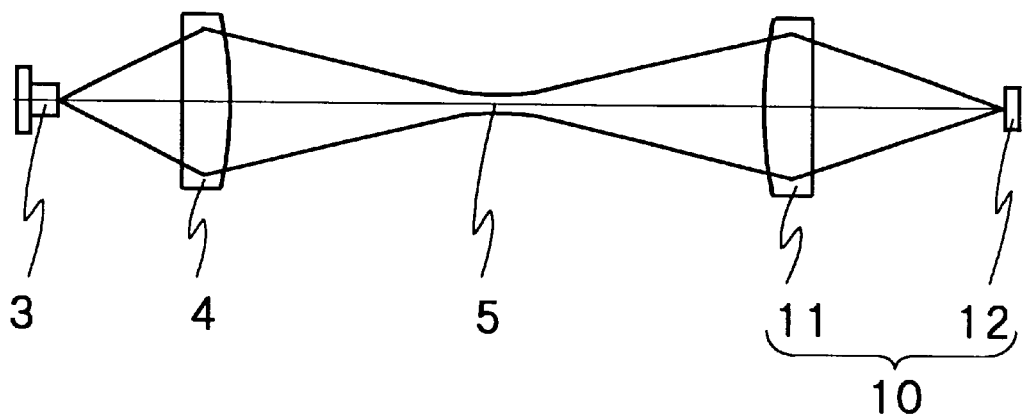
FIG. 1(a) and FIG. 1(b) are explanatory views of the structure of an embodiment of a light receiving unit according to the present invention.
Figure 1:
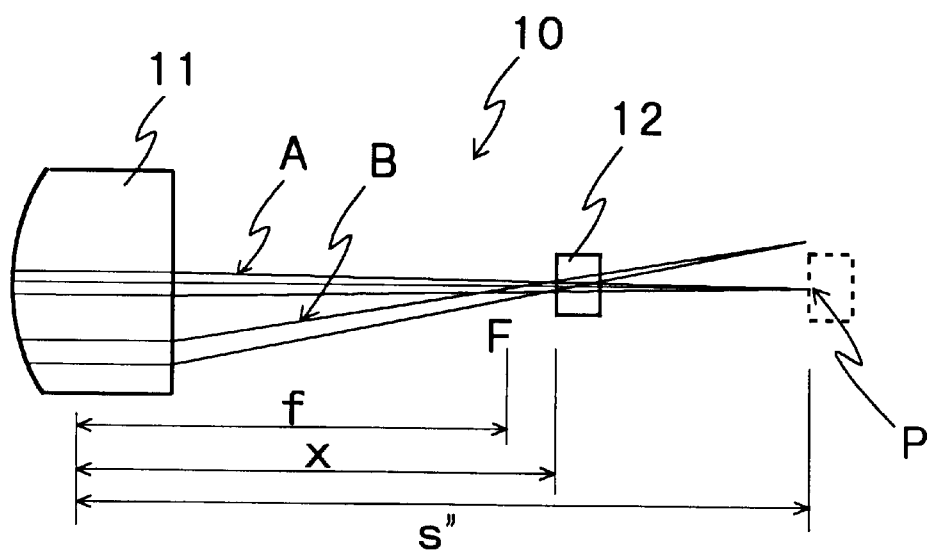

The example shown in FIG. 1 shows an instance of the structure of, for example, a laser sensor which detects ink droplets of an ink jet printer or the like. In the structure, the beam from a laser source 3 made of, for example, a semiconductor laser is gathered up by a condenser lens 4 which is made of an aspheric lens and which is disposed on the side of the light source to carry out the sensing of fine particles and the like at a minimum spot beam portion 5. The beam converged by the condenser lens of the light source side is again spread after passing through the sensing zone, and is converged again by the condenser lens 11 in the light receiving unit 10 as aforementioned and detected by the light receiving element 12.

The condenser lens 11 is an aspheric lens made of, for example, glass. The condenser lens 11, which has an aperture of about 3 to 15 mm and of which the focal distance is about 10 mm may be used. The light receiving element 12, a usual pn junction (pin) made of silicon or the like may be used. In the example shown in FIGS. 1(a) and 1(b), one having a light receiving surface of a 1 mm by 1 mm square with a small junction area is used to increase the speed of response. As will be mentioned later, the capacity can be made small most simply by making the light receiving area smaller and the speed of response can be made to be 1$\mu$s or less by designing the light receiving area to be 2 mm² or less.

As outlined above, the inventor of the present invention has tried to decrease the light receiving area (the area of a pn junction) of the light receiving element 12 based on the necessity to raise the response speed of the light receiving element 12 in order to detect high speed fine particle with high accuracy. To state in more detail, the response speed (rise time) of the light receiving element 12 is proportional to the product of the capacity of the light receiving element 12 and the input impedance of an amplification circuit in the subsequent stage. The capacity of the light receiving element 12 varies corresponding to the capacitance which is the sum of the capacity of a package and the junction capacitance Cj of the pn junction, and carrier density. The inventor of the present invention has made an attempt to decrease the junction capacitance Cj of the light receiving element by decreasing the light receiving area without changing factors which are liable to affect the characteristics such as carrier density so as not to affect the light receiving characteristics to excess. Then the inventor has conducted earnest studies and as a result, found that in order to measure high speed flying particles such as ink droplets, the junction capacitance Cj must be reduced to about 400 pF or less and the light receiving area must be reduced to 2 mm² or less, preferably to a size of a 1 mm by 1 mm square or less and more preferably to a size of 0.75 mm by 0.75 mm or less.

Figure 2:
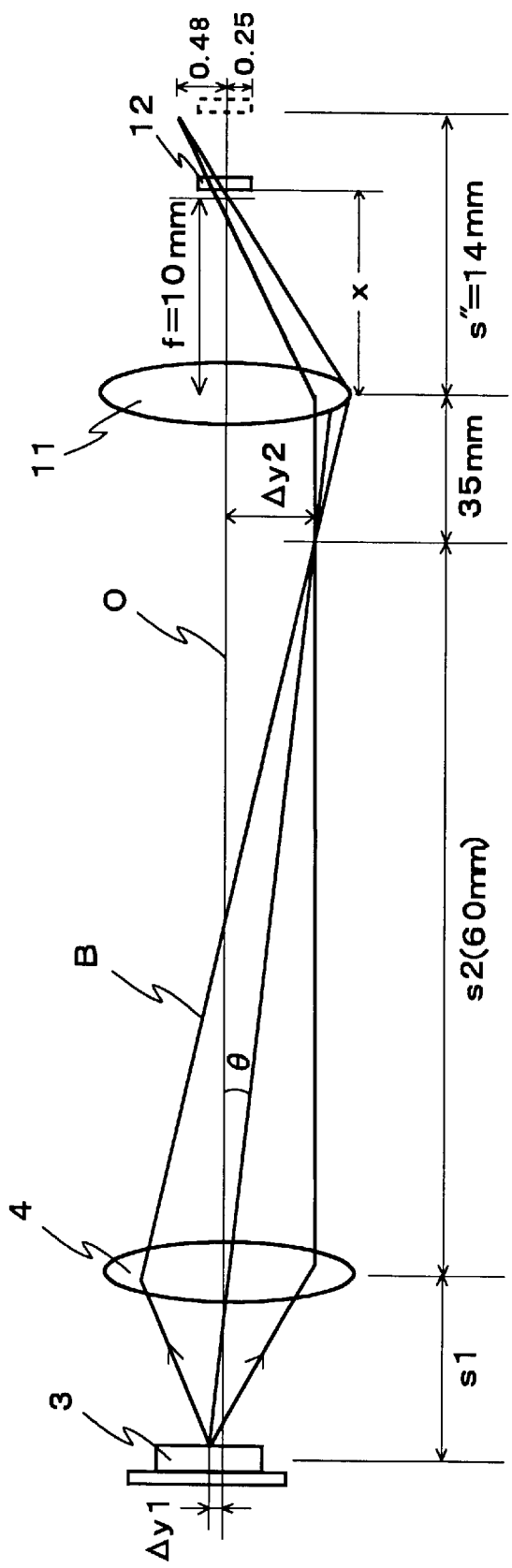
FIG. 2 is a view for explaining a shift of an imaging point when the laser source is made eccentric in the structure of FIG. 1.
Figure 3:
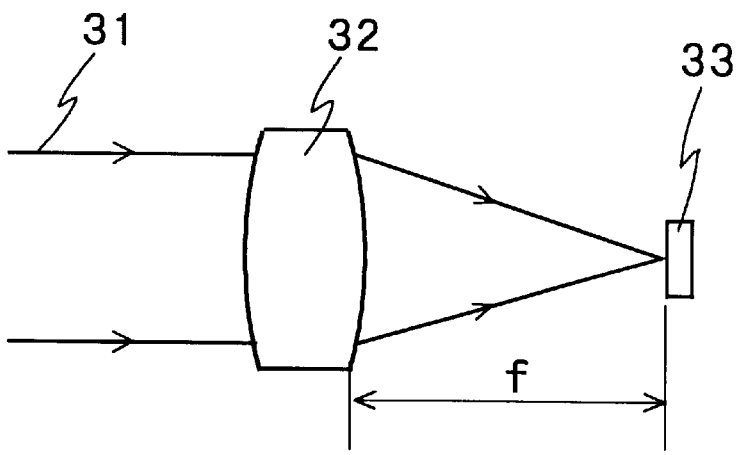
FIG. 3 is an explanatory view showing the conventional relationship of the positioning of a light receiving element to a laser source.
Figure 4:
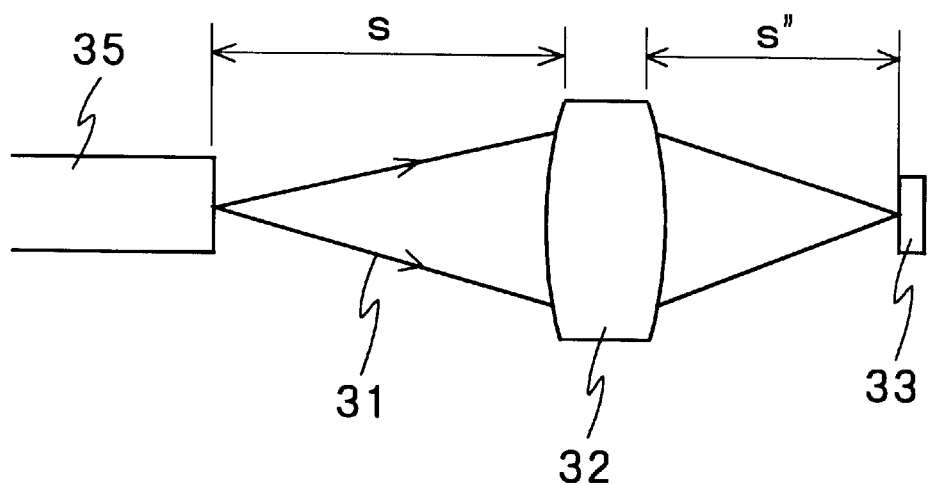
FIG. 4 is an explanatory view showing the conventional relationship of the positioning of a light receiving element to a laser source.

As mentioned above, if the light receiving area of the light receiving element 2 is reduced, there is the case where no beam can be received by the light receiving element when there exists eccentricity on the side of the laser source. As shown in FIG. 2, for example, when the laser source 3 is eccentric by $\Delta y1$ (e.g., 0.2 mm), the inclination $\theta$ of the optical axis is given by the formula tan $\theta=\Delta y1/f$ for an image formed at the position s2 (e.g., 60 mm) away from the condenser lens 4 of the side of the light source. From FIG. 2, tan $\theta=\Delta y1/s1$. Because s2 is far larger than s1 in the Gauss' theorem $1/s1+1/s2=1/f$, s1 is almost regarded as f. As a result, tan $\theta=\Delta y1/f$. Here, when $\Delta y1=0.2$ mm and $f=10$ mm, a shift $\Delta y2$ from the center line of the imaging point is given by the following formula $\Delta y2=s2 \times \tan\theta=1.2$ mm.

When the beam advances 35 mm ahead, light rays are incident on the condenser lens 11 whose focal distance is 10 mm and are thereby converged, s"=14 mm from the Gauss' theorem $1/35+1/s"=1/10$ and hence the eccentricity of the beam is given by the formula $1.2 \times 14/35=0.48$ mm. Thus the beam is finally eccentric by 0.48 mm. If the eccentricity of the beam is as large as this, no beam is received at all when the light receiving element is the aforementioned 0.5 mm by 0.5 mm square since the light receiving surface of the light receiving element 12 is limited within the range 0.25 mm apart from the center line.

The inventor of the present invention has conducted earnest studies to solve such a problem and as a result, found the following fact. Specifically, the magnitude of the eccentricity can be restrained to 0.2 mm or less from the assembly accuracy. If the beam is received when the eccentricity is 0.2 mm, the beam can be always received. Also, the beam from an eccentric light source crosses the center line O of an optical system to form an image as shown in FIG. 1(b) and FIG. 2. In addition, the point of intersection is formed in the vicinity of the position at the focal distance f of the condenser lens 11 of the light receiving side and at the position more distant than the focal distance. Therefore, if the light receiving element 12 is placed in the vicinity of that point, the beam can be always received even if the beam is eccentric by about 0.2 mm, although the light receiving sensibility is slightly reduced since that position is not the imaging point. Namely, the light receiving element is placed preferably between the position of the focal distance f of the condenser lens 11 and the position s" where an image is regularly formed and more preferably at the position given by the formula f $\leq$ x $\leq$ (s"+f)/2 where x is the distance of the light receiving element 12 from the secondary principal plane of the condenser lens 11. By this measurement, the light receiving unit according to the present invention can deal sufficiently with the eccentricity even if the light receiving area of the light receiving element 12 is decreased to raise the response speed.

The reason why the position where the light receiving element 12 is placed is made more distant than the focal distance f is that even the eccentric beam resultantly passes the center line at the point far behind the back focal point since the beam forming an image at the position far before the front focal point of the condenser lens 11 are converged. Also, the reason why the light receiving element is placed at the side of the condenser lens 11 closer to the condenser lens than the position of (s"+f)/2 is that if the light receiving element is placed at the side of the condenser lens 11 by a distance (s"−f)/2 from the original image forming point, the positional shift becomes half the shift on the original image forming surface (position at a distance of 14 mm from the condenser lens 11). Hence, even in the case where the eccentricity is 0.2 mm, the beam is incident sufficiently on the light receiving surface of the light receiving element 12 and when the light receiving element 12 is placed closer to the side of the condenser lens 11 than in the above case, the beam ranges within the light receiving surface. However, when the light receiving element is excessively closer to the side of the condenser lens 11, the light receiving sensitivity is reduced and hence it is desirable to place the light receiving element 12 close to the condenser lens 11 to the extent that the eccentric beam can be received.

For instance, when f and s" have the aforementioned dimensions, originally the highest sensitivity is obtained when the light receiving element 12 is placed at a distance of 14 mm from the condenser lens 11. By placing the light receiving element closer to the side of the condenser lens by 3 mm (x=11) than the aforementioned original position, the beam can be received even if the eccentricity exists. Also, the speed of response is 0.2 µs in terms of rise time so that high speed particles can be detected sufficiently, the greatly improving the reliability.

FIG. 1(b) shows the beam in the case A where the eccentricity of the laser source is 0 and in the case B where the eccentricity of the laser source is 0.2 (FIG. 2 shows only the case B where the eccentricity of the laser source is 0.2). In FIG. 1(b), the beam in the case where the eccentricity of the laser source is 0.1 since the figure will be complicated. However, the case where the eccentricity of the laser source is 0.1 is also examined and as a consequence, the convergent point at the place 14 mm apart from the condenser lens 11 is a position very closest to the end of the light receiving element 12 and hence the sensibility was very low. However, when the light receiving element was shifted to the side of the condenser lens 11 by about 3 mm and placed, sufficient sensibility was obtained. Also, in FIG. 2, the size of each part is not necessarily described in exact dimension.

The present invention ensures that if the setting is made such that the laser beam is incident on a lens even when the omitted beam is inclined on account of assembly shift and installation shift of a laser unit, the converged laser beam enters to the light receiving element without shifting out of the light receiving surface. Also, because in the present invention, the light receiving area of the light receiving element is made small, the junction capacitance of the light receiving element is decreased, the speed of response is raised and hence high speed fine particles can be detected exactly.

As this invention may be embodied in several forms without departing from the spirit of essential characteristics thereof, the foregoing embodiments are therefore illustrative and should not be interpreted as restrictive, and all changes that fall within equivalence of claims are therefore intended to be embraced by the claims.

What is claimed is:

1. A laser beam receiving unit which receives the laser beam to detect a detection object passing through said laser beam comprising:

a condenser lens which converges said laser beam; and a light receiving element which receives the incident beam converged by said condenser lens, wherein said light receiving element is formed, such that the light receiving portion thereof has an area of 2 mm$^2$ or less, and is disposed on one side of said condenser lens closer to the condenser lens than a point where said laser beam is converged by said condenser lens, and is disposed at a focal point of said condenser lens or at a position further from said condenser lens than the focal point.

2. A laser beam receiving unit according to claim 1, wherein when said focal distance of said condenser lens is f, the distance between the point where said laser beam is converged by said condenser lens and said condenser lens is s" and the distance between the position where said light receiving element is disposed and said condenser lens is x, said light receiving element is disposed at the position determined by the formula f$\leq$x$\leq$(s"+f)/2.

3. A laser beam receiving unit according to claim 1, wherein the size of said light receiving element is preferably a 1 mm by 1 mm square or less.

4. A laser beam receiving unit according to claim 1, wherein said laser beam is a laser beam for which laser light emitted from a laser source is converged by said condenser lens to form a minimum beam spot portion and a part of which is intercepted by a detection object passing through the minimum beam spot portion.

5. A laser beam receiving unit according to claim 1, wherein said detection object is a plurality of high speed fine particles.

6. A laser beam receiving unit according to claim 1, wherein said detection object passing through the minimum beam spot portion is ink droplets of an ink jet printer.

* * * * *